United States Patent
Gonsalves et al.

(10) Patent No.: US 7,293,291 B2
(45) Date of Patent: Nov. 6, 2007

(54) SYSTEM AND METHOD FOR DETECTING COMPUTER PORT INACTIVITY

(75) Inventors: Brian Gonsalves, Antioch, CA (US); Kenneth Roger Jones, Cool, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 112 days.

(21) Appl. No.: 10/623,274

(22) Filed: Jul. 18, 2003

(65) Prior Publication Data
US 2005/0015615 A1 Jan. 20, 2005

(51) Int. Cl.
- G06F 7/04 (2006.01)
- G06F 17/30 (2006.01)
- G06F 7/58 (2006.01)
- G06K 9/00 (2006.01)
- H03M 1/68 (2006.01)
- H04L 9/00 (2006.01)
- H04K 1/00 (2006.01)

(52) U.S. Cl. .............. 726/26; 726/27; 726/28; 726/29; 726/30; 726/3; 726/4; 726/5; 726/6; 713/168; 713/169; 713/170; 713/151; 713/152; 713/153

(58) Field of Classification Search ........ 710/104–105; 370/463, 480, 352; 379/93; 726/1–7, 11–15, 726/23–30; 713/151–154
See application file for complete search history.

(56) References Cited

U.S. PATENT DOCUMENTS

| | | | |
|---|---|---|---|
| 6,145,083 A * | 11/2000 | Shaffer et al. ................. | 726/7 |
| 6,272,127 B1 | 8/2001 | Golden et al. | |
| 6,351,452 B1 | 2/2002 | Koenig et al. | |
| 6,389,464 B1 | 5/2002 | Krishnamurthy et al. | |
| 6,445,682 B1 | 9/2002 | Weitz | |
| 6,477,579 B1 | 11/2002 | Kunkel et al. | |
| 6,477,595 B1 * | 11/2002 | Cohen et al. ................ | 710/105 |
| 6,498,791 B2 | 12/2002 | Pickett et al. | |
| 6,510,152 B1 * | 1/2003 | Gerszberg et al. .......... | 370/352 |
| 6,526,581 B1 | 2/2003 | Edson | |
| 6,553,489 B1 | 4/2003 | Osler et al. | |
| 6,559,769 B2 | 5/2003 | Anthony et al. | |
| 6,560,222 B1 | 5/2003 | Pounds et al. | |
| 6,584,502 B1 | 6/2003 | Natarajan et al. | |
| 6,594,695 B1 | 7/2003 | Vasamsetti et al. | |
| 6,614,781 B1 | 9/2003 | Elliott et al. | |
| 6,631,120 B1 | 10/2003 | Milbrandt | |
| 6,631,436 B1 | 10/2003 | Liu et al. | |
| 6,636,505 B1 | 10/2003 | Wang et al. | |
| 6,807,666 B1 * | 10/2004 | Evans et al. ................ | 718/108 |

* cited by examiner

Primary Examiner—Ayaz Sheikh
Assistant Examiner—Longbit Chai
(74) Attorney, Agent, or Firm—Toler Schaffer LLP

(57) ABSTRACT

A system and method for detecting an idle or inactive data port connection on a personal computer (PC) and blocking external access, e.g., Wide Area Network (WAN) access to an end-user PC is presented. The system provides for added security for unattended PCs having broadband connections. The idle time period for detection/blocking logic initiation of a blocking signal to disable communications, e.g., Ethernet port access to the PC, may be for a fixed time period or may be determined by a user of the end-user PC.

29 Claims, 2 Drawing Sheets

SYSTEM AND METHOD FOR DETECTING COMPUTER PORT INACTIVITY

FIELD OF THE DISCLOSURE

The present disclosure relates generally to broadband communications, and particularly to a system and method for detecting an unattended or idle PC with an open data port.

DESCRIPTION OF THE RELATED ART

The widespread deployment of consumer broadband access, e.g., xDSL and/or cable modems, has benefited millions of subscribers by providing reliable, high speed Internet access. Broadband modems permit data downloads at speeds far above that obtainable through a conventional dial-up modem, e.g., 33 Kb/s or 56 Kb/s. However, as with many new technologies, there are also disadvantages associated with some aspects of the technology. For example, many broadband residential customers do not regularly update anti-virus software or employ firewalls/monitoring software on their broadband access computers. This leaves an unattended computer with a connection, or open port, to a wide area network. This open port is susceptible to probing and subsequent hijacking by malicious and/or unethical individuals, e.g., crackers and hackers.

A prominent recent case involving the use of zombies, or computers that are owned by third parties but taken over (hijacked) by crackers, was the Yahoo denial-of service (DoS) incident. In this incident, daemons (disk and execution monitors) were surreptitiously set up to generate spurious requests for information to Yahoo (and other sites such as Amazon, CNN, and eBay), at rates of up to one gigabyte per second, effectively shutting down Yahoo's equipment.

Subsequent investigations of the Yahoo DoS incident revealed that a majority of the owners of the computers that sent the spurious requests had broadband Internet access and were not even aware that their computers had been turned into zombies and used to carry out the DoS attack. Some people recalled noticing that their broadband connection seemed somewhat slower, but many people were not even at their computers during the times the attack was in progress.

Another troublesome recent development is the use of a virus sent to computer users to take over or hijack other people's computers to make them junk e-mail (spam) senders. Unlike most other mass-mailing viruses, this virus, dubbed AVF, doesn't e-mail itself to everyone in the infected computer's address book, but instead provides a backdoor into the computer. This backdoor is then utilized by spammers to send junk mail, providing anonymity for the spammer's illegal activities.

Scrupulous use of anti-virus software with regular updates and the use of personal firewalls and/or monitoring software could prevent the creation of zombie computers and hijacks. Turning off the unattended computer also provides protection. However, many people do not avail themselves of these options for various reasons ranging from lack of technical savvy to time constraints, or failing to understand the magnitude of the problem.

Accordingly, a need exists to provide additional security to unattended PCs with "always on" network connections.

SUMMARY

In a particular embodiment, a system for detecting an idle state in an end-user computer and subsequent blocking of the open Ethernet connection of the idle computer is presented. The system includes a first interface to a local area network (LAN) connection to an end-user computer and a second interface to a wide area network (WAN), such as a digital subscriber line (DSL) connection, to a distributed computer network, such as the Internet. In a particular embodiment, the second interface is coupled to an Internet service provider (ISP). Detection logic responsive to the first interface is used to detect user inactivity at the end-user computer, and blocking logic responsive to the detection logic selectively initiates a blocking signal to disable communications received from the second interface from being sent over the first interface to the remote end-user computer.

In a particular embodiment, the blocking logic sends the blocking signal in response to the detecting logic detecting the user inactivity for a selected period of time. In one embodiment, the selected period of time is between one and ten minutes. In another embodiment, the selected period of time is a fixed time period. In a further embodiment, the selected period of time is determined by a user of the end-user computer.

In a particular embodiment, the first interface, the detection logic, and the blocking logic are embedded within an auto-sensing Ethernet port. In another embodiment, the DSL connection carries authenticated point-to-point protocol over Ethernet (PPPoE) session traffic.

In a further embodiment, a method is disclosed that includes establishing a broadband connection, detecting an inactivity event, and blocking data. The broadband connection includes a first local data connection, e.g., an Ethernet connection, between an end-user computer and routing equipment, as well as a second, wide area data connection, e.g., a PPPoE session, between the routing equipment and an ISP. Detection of an inactivity event from the end-user computer occurs at the routing equipment, and is based upon detecting that the end-user computer has been idle for an idle time greater than an idle time activity threshold. The routing equipment then blocks data originating from the second, wide area data connection from being communicated to the first local data connection, thus establishing a blocking condition.

In another embodiment, the method further includes removing the blocking condition to allow communications from the second, wide area data connection to be sent to the first local data connection. Following blocking condition removal, data communications from the first local data connection is then allowed to be communicated to the second wide area data connection.

In a particular embodiment, a method of routing data at digital subscriber line (DSL) routing equipment is presented. The method includes establishing a first portion of a DSL connection and establishing a second portion of the DSL connection. The first portion of the DSL connection includes a local Ethernet data connection between an end-user computer and DSL routing equipment and terminates at a first port of the DSL routing equipment. The second portion of the DSL connection includes a wide area data connection between the DSL routing equipment and internet service provider (ISP) equipment and terminates at a second port of the DSL routing equipment. The method further includes detecting, at the first port of the DSL routing equipment, an indication that the end-user computer has been idle for an idle time greater than an idle time inactivity threshold. Further, during a first period of time, data received from the second port of the DSL routing equipment is blocked from being communicated by the first port of the DSL routing equipment.

In a particular embodiment, the method also includes, during a second period of time after the first period of time, detecting activity at the first port of the DSL routing equipment. This detection indicates activity at the end-user computer. In response to the activity detection, data received at the second port of the DSL routing equipment would be communicated to the first port of the DSL routing equipment, and to the end-user computer.

DETAILED DESCRIPTION OF THE DRAWINGS

The present disclosure relates generally to broadband communications, and particularly to a system and methods for blocking external access, e.g., wide area network (WAN) access to an unattended or idle end-user personal computer (PC) with an open local area network (LAN) port. Employing the techniques disclosed herein provides an element of security to unattended PCs, and does not require end-users to install/configure additional hardware or software, thereby providing an element of convenience as well as connection security to end-users.

Figure 1:
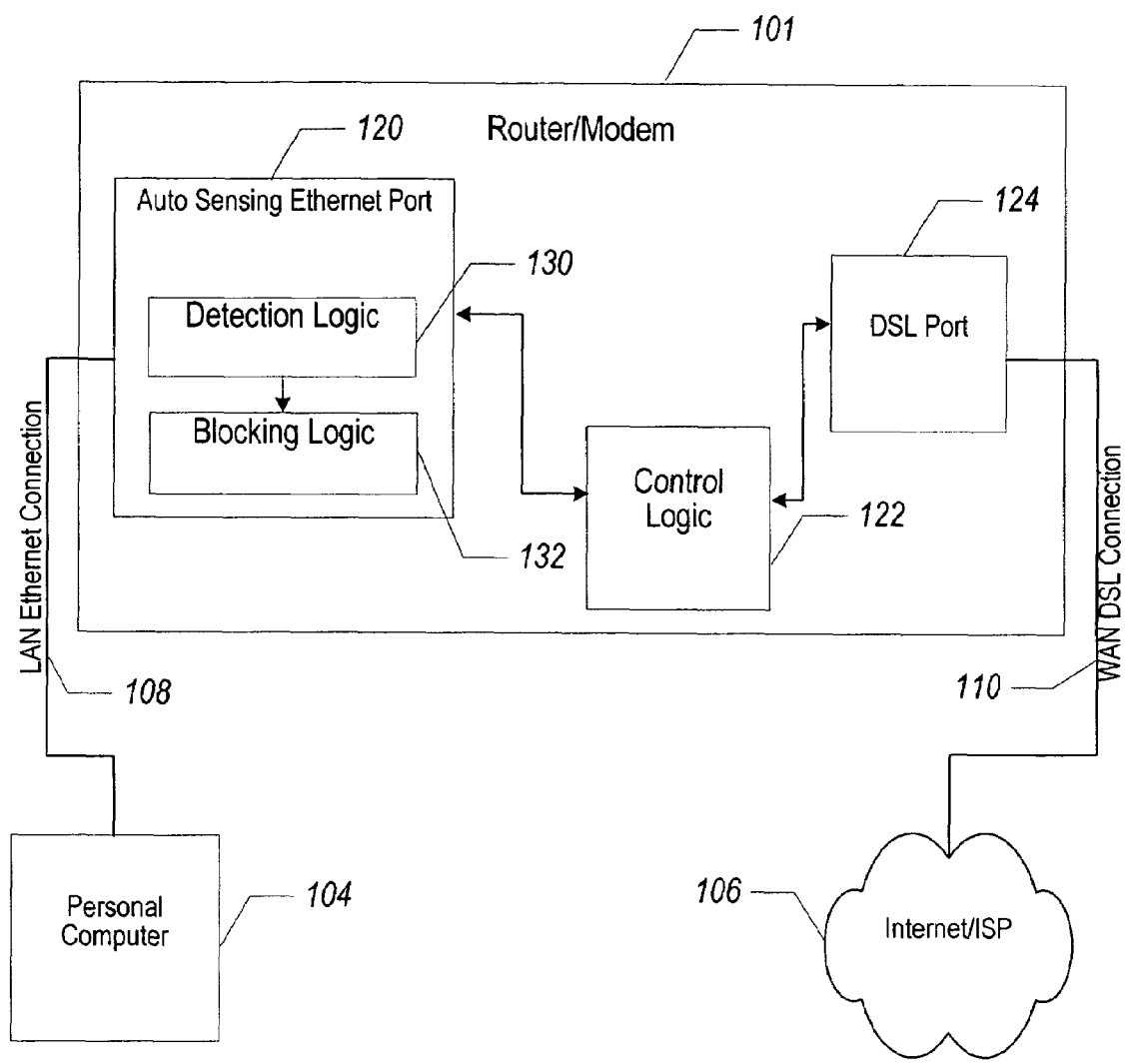
FIG. 1 is a general diagram illustrating a system for router/modem configuration to detect end-user computer inactivity and/or activity and to selectively block or unblock Ethernet port access accordingly.

FIG. 1 is a general diagram illustrating a system for router/modem configuration to detect end-user computer inactivity and/or activity, as well as to selectively block or unblock Ethernet port access accordingly. The example system presented in FIG. 1 includes an end-user personal computer (PC) 104. The system also includes a first interface 108 to a local area network (LAN) Ethernet connection to the end-user computer 104 in communication with an auto sensing Ethernet port 120 in a router/modem 101. The router/modem 101 includes a second interface 110 to a wide area network (WAN) digital subscriber line (DSL) connection from a DSL port 124 to a distributed computer network 106. The distributed computer network 106 can be a public Internet protocol (IP) network, such as the Internet. The second interface 110 may be coupled to an Internet service provider (ISP). In a particular embodiment, the DSL connection of the second interface 110 carries authenticated point to point over Ethernet (PPPoE) session traffic.

The auto sensing Ethernet port 120 includes detection logic 130 responsive to the first interface 108 and is used to detect user inactivity at the end-user computer 104. The auto sensing Ethernet port 120 also includes blocking logic 132 responsive to the detection logic 130. Blocking logic 132 is used to selectively initiate a blocking signal to disable communications received from the second interface 110 from being sent over the first interface 108 to the end-user computer 104. In an exemplary embodiment, the detection logic 130 and the blocking logic 132 are embedded within the auto sensing Ethernet port 120. In other embodiments, these elements may be separate components or may be integrated with other functions.

The blocking logic 132 sends a blocking signal in response to the detection logic 130 detecting user inactivity on PC 104 for a selected period of time. In a particular embodiment, the selected period of time is between one and ten minutes of inactivity, as detected by detection logic 130.

In other embodiments, the selected period of time can be a fixed time period, which may be a default time period, e.g., five minutes, or the selected period of time may also be determined by a user of the end-user computer 104.

The router/modem 101 may be digital switching equipment such as a router or routing equipment, or may be a modem. The modem may be an asynchronous digital subscriber line (ADSL) modem, a digital subscriber line (DSL) modem, or other xDSL modems or high-speed interfaces utilized to establish layer 2 connections, e.g., PPPoE, between an ISP and the customers of the ISP.

Figure 2:
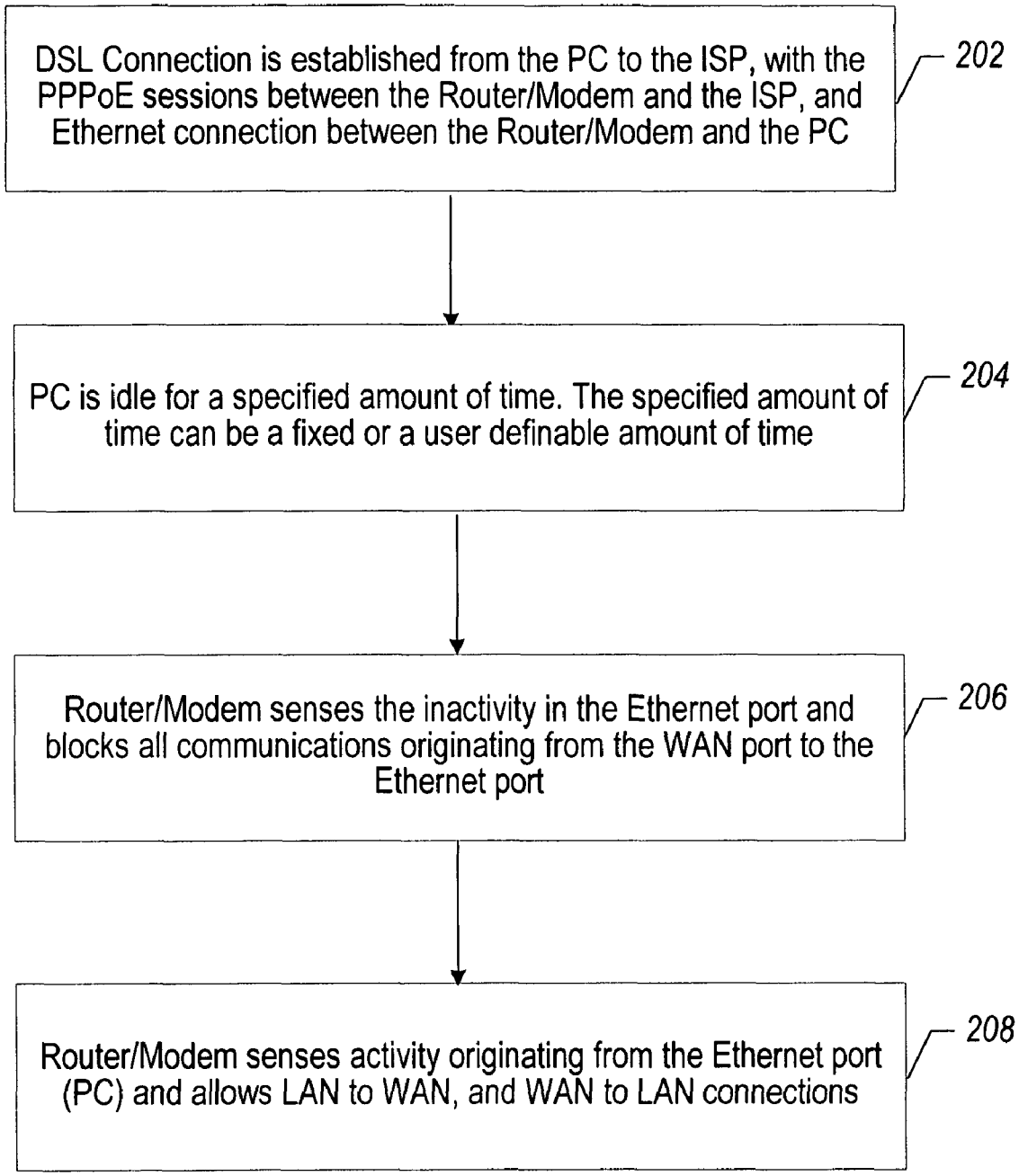
FIG. 2 is a flow diagram illustrating methods for blocking and/or unblocking Ethernet port access to a personal computer.

FIG. 2 is a flow diagram illustrating methods for blocking and/or unblocking Ethernet port access to a personal computer. In step 202, a digital subscriber line (DSL) connection is established between an end-user computer to an Internet service provider (ISP). The DSL connection includes a first local data connection between an end-user computer, e.g., an Ethernet connection, and routing equipment and a second wide area network (WAN) data connection, e.g., a PPPoE session, between the routing equipment and the ISP.

Typically, both the first data connection and the second data connection are always open connections, however, this provides an "open door" for outside port scanners who may be looking for open connections to hijack. However, the present disclosure utilizes detection logic in the routing equipment, e.g., a router or modem, to detect that an end-user computer has been idle for an idle time greater than an idle time inactivity threshold to determine that an inactivity event has occurred at the routing equipment, as in step 204. The idle time inactivity threshold, or specified amount of time of inactivity by the end-user computer, can be a fixed threshold defining a fixed amount of time, or can be a programmable threshold. Further, a method for receiving user defined idle time information may be employed. This method would permit the modification of the idle time inactivity threshold to be set based upon the user's defined idle time information.

In response to detection of an inactivity event at the Ethernet port to the end-user computer and in response to blocking logic, the routing equipment 101 blocks all communication data originating from the second connection (i.e. the WAN connection) to the Ethernet connection (i.e. LAN connection to PC), as in step 206. This, in effect, closes the open Ethernet connection port, thus providing an element of security to the unattended end-user computer. Generally, a connection cannot be hijacked if it is not available, i.e., is not open.

Once a user returns to actively using the computer, the routing equipment detects the activity from the end-user computer and removes the blocking condition to allow communications from the WAN data connection to be sent to the Ethernet connection of the end-user computer via the routing equipment, as in step 208. This unblocking step also may include allowing data to be sent from the Ethernet connection of the end-user computer via the routing equipment to the WAN data connection of the ISP, since the end-user computer is no longer unattended. At this point, a normal DSL connection has been reestablished.

The system and methods described herein provides for a flexible implementation. Although the invention has been described using certain specific examples, it will be apparent to those skilled in the art that the invention is not limited to these few examples. Additionally, various types of routers, routing equipment, and/or modems are currently available which could be suitable for use in detecting and blocking idle connections for Ethernet communication sessions when employing the methods and system as taught herein. The above-disclosed subject matter is to be considered illustrative and not restrictive and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a router, including:
      a first interface to communicate with a local area network connection at an end user computer;
      a second interface to communicate with a wide area network connection to at a distributed computer network;
      detection logic responsive to the first interface, the detection logic to detect user inactivity at the end-user computer; and
      blocking logic responsive to the detection logic, the blocking logic to selectively initiate a blocking signal to disable communications received at the second interface from being sent over the first interface to the end-user computer; wherein
      the detection logic and the blocking logic are embedded within an auto-sensing Ethernet port of the router.

2. The system of claim 1, wherein the blocking logic sends the blocking signal in response to the detecting logic detecting the user inactivity for a selected period of time.

3. The system of claim 2, wherein the selected period of time is between one and ten minutes.

4. The system of claim 2, wherein the selected period of time is a fixed time period.

5. The system of claim 2, wherein the selected period of time is determined by a user of the end-user computer.

6. The system of claim 1, wherein the wide area network is a digital subscriber line connection that carries authenticated point to point protocol over Ethernet session traffic.

7. The system of claim 1, wherein the distributed computer network is the Internet.

8. The system of claim 1, wherein the second interface is coupled to an internet service provider.

9. A method comprising:
   establishing a broadband connection at routing equipment, the broadband connection including a first local data correction between an end-user computer and the routing equipment and a second wide area network data connection between the routing equipment and an internet service provider;
   detecting at the routing equipment that the end-user computer has been idle for an idle time greater than an idle time inactivity threshold and determining an inactivity event at the routing equipment; and
   initiating a blocking signal at the routing equipment to establish a blocking condition, the blocking signal blocking data received at the routing equipment via the second wide area network data connection from being communicated from the routing equipment to the end-user computer via the first local data connection; wherein
   detection logic and blocking logic are embedded within an auto-sensing Ethernet port of the routing equipment.

10. The method of claim 9, further comprising detecting activity from the end-user computer at the routing equipment.

11. The method of claim 10, further comprising removing the blocking condition to allow communications from the second wide area data connection to be sent to the first local data connection.

12. The method of claim 11, further comprising allowing data communications from the first local data connection to be communicated to the second wide area data connection.

13. The method of claim 9, wherein the first local data connection is an Ethernet connection.

14. The method of claim 9, wherein the second wide area data connection is a point to point over Ethernet session.

15. The method of claim 9, wherein the idle time inactivity threshold is a fixed threshold defining a fixed amount of idle time.

16. The method of claim 9, wherein the idle time activity threshold is a programmable threshold.

17. The method of claim 16, further comprising receiving user defined idle time information and modifying the idle time inactivity threshold based on the user defined idle time information.

18. A method of routing data at digital subscriber line routing equipment, the method comprising:
   establishing a first portion of a digital subscriber line connection at digital subscriber line routing equipment, the first portion of the digital subscriber line connection including a local Ethernet data connection between an end-user computer and the digital subscriber line routing equipment, the first port of the digital subscriber line connection terminating at a first port of the digital subscriber line routing equipment;
   establishing a second portion of the digital subscriber line connection, the second portion of the digital subscriber line connection including a wide area data connection between the digital subscriber line routing equipment and internet service provider equipment, the second portion of the digital subscriber line connection terminating at a second port of the digital subscriber line routing equipment;
   detecting at the first port of the digital subscriber line routing equipment an indication that the end-user computer has been idle for an idle time greater than an idle time inactivity threshold; and
   during a first period of time, initiating a blocking signal at the digital subscriber line routing equipment, the blocking signal blocking data received from the second port of the digital subscriber line routing equipment from being communicated by the first port of the digital subscriber line routing equipment; wherein
   detection logic and blocking logic are embedded within an auto-sensing Ethernet port of the digital subscribe line routing eguipment.

19. The method of claim 18, further comprising, during a second period of time after the first period of time, detecting activity at the first port of the digits subscriber line routing equipment indicating activity at the end-user computer and communicating data received at the second port of the digital subscriber line routing equipment to the first port of the digital subscriber line routing equipment and to the end-user computer.

20. The method of claim 19, wherein the idle time inactivity threshold is a fixed threshold defining a fixed amount of idle time.

21. The method of claim 19, wherein the idle time inactivity threshold is a programmable threshold.

22. A system, comprising:
a router, including:
   a first interface to a local area network, said local area network comprising a plurality of end-user computers;
   a second interface to a wide area network connection;
   detection logic responsive to the first interface, the detection logic to detect user inactivity at one or more of the plurality of end-user computers; and
   blocking logic responsive to the detection logic, the blocking logic to selectively initiate a blocking signal to selectively disable communications from being sent over the first interface to at least one of the plurality of end-user computers in the local area network while allowing communications to be sent over the first interface to at least one other of the plurality of end-user computers in the local area network; wherein the detection logic and the blocking logic are embedded within an auto-sensing Ethernet port of the router.

23. The system of claim 22, wherein the user inactivity is detected after a selected period of time.

24. The system of claim 22, wherein the detection logic and the blocking logic is embedded within an auto-sensing Ethernet port.

25. A method comprising:
   establishing a broadband connection at a router, the broadband connection including a first data connection between a local area network coupled to a plurality of end-user computers and a wide area network data connection to an internet service provider;
   detecting at the router that one or more of the plurality of the end-user computers in the local area network has been idle for a time greater than an inactivity threshold; and
   initiating a blocking signal at the router, the blocking signal selectively blocking data originating from the wide area network data connection from being communicated to the one or more of the plurality of inactive end-user computers while allowing data originating from the wide area network data connection to be communicated to at least one of the plurality of the end-user computers that remains in an active state;
   wherein detection logic and blocking logic are embedded within an auto-sensing Ethernet port of the router.

26. The method of claim 25, further comprising detecting resumed activity from at least one of the one or more of the plurality of end-user computers previously in an inactive state.

27. The method of claim 26, further comprising allowing communications from the wide area network data connection to be sent to the at least one of the one or more of the plurality of end-user computers previously in an inactive state.

28. The method of claim 25, wherein the first data connection is an Ethernet connection.

29. The method of claim 25, wherein the wide area network data connection is a point to point over Ethernet session.

* * * * *